March 26, 1957 R. ADLER 2,786,943

ELECTRON DISCHARGE DEVICES

Filed July 10, 1953 2 Sheets-Sheet 1

ROBERT ADLER
*INVENTOR.*

BY Francis W. Crotty

HIS ATTORNEY.

March 26, 1957 R. ADLER 2,786,943

ELECTRON DISCHARGE DEVICES

Filed July 10, 1953 2 Sheets-Sheet 2

ROBERT ADLER
*INVENTOR.*

BY Francis W. Crotty

HIS ATTORNEY.

United States Patent Office 2,786,943

Patented Mar. 26, 1957

2,786,943

ELECTRON DISCHARGE DEVICES

Robert Adler, Northfield, Ill., assignor to Zenith Radio Corporation, a corporation of Illinois Application July 10, 1953, Serial No. 367,184

10 Claims. (Cl. 250—36)

This invention pertains to new and improved electron-discharge devices of the type employing deflection control, commonly known as beam-deflection tubes, and to high-frequency oscillators employing such devices.

Relatively recent advances in the communications art have led to an increased use of the high-frequency portions of the frequency spectrum for commercial purposes, as exemplified by the very-high-frequency (V. H. F.) and ultra-high-frequency (U. H. F.) television broadcast bands and the frequency-modulation radio broadcast band. As a result, manufacturers of receiver equipment intended for use at these frequencies have been faced with the necessity of developing suitable stable oscillators for generating demodulating- or heterodyning-signals within the same general range of frequencies. Intensity-modulation devices of the familiar grid-control type capable of operation as oscillators within both the V. H. F. and U. H. F. frequency ranges have been developed; however, these tubes present several inherent difficulties, among which are the necessity of maintaining relatively rigid dimensional tolerances and the problems presented in compensating for changes in the electrical characteristics of the tubes due to changes in thermal operating conditions. On the other hand, velocity-modulation devices such as klystrons and magnetrons appear to be overly complex and expensive for receiver applications and are not particularly satisfactory for operation in the lower or V. H. F. portion of the newly-utilized frequency ranges.

Accordingly, it is a primary object of the invention to provide a new and improved beam-deflection tube which is capable of operation at frequencies within the V. H. F. and U. H. F. ranges and which does not present the problems and difficulties outlined above in connection with the use of intensity- or velocity-modulation devices.

It is a further object of the invention to provide a new and improved oscillator circuit for use at very-high or ultra-high frequencies which employs an electron-discharge device of the beam-deflection type.

It is an additional object of the invention to provide a new and improved beam-deflection tube which is relatively simple and expedient to construct and economical to manufacture.

In accordance with the invention, an electron-discharge device of the beam-deflection type for generating electrical oscillations of a predetermined frequency comprises an electron gun for projecting a sheet-like beam of electrons along a predetermined path at a predetermined velocity. The device further includes a reflector electrode system, disposed transversely across the electron beam path in spaced relation to the electron gun to establish an effective reflector plane and re-direct a stream of the electrons of the beam toward the electron gun. A pair of deflector-receptor electrodes are disposed on opposite sides of the electron beam path intermediate the electron gun and the reflector electrode system in inductive coupling relation to the projected electron beam and to the stream of reflected electrons, the deflector-receptor electrodes being arranged to pass substantially all of the reflected electrons back toward the electron gun.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like reference numerals in the several figures refer to like elements, and in which:

Figure 1:
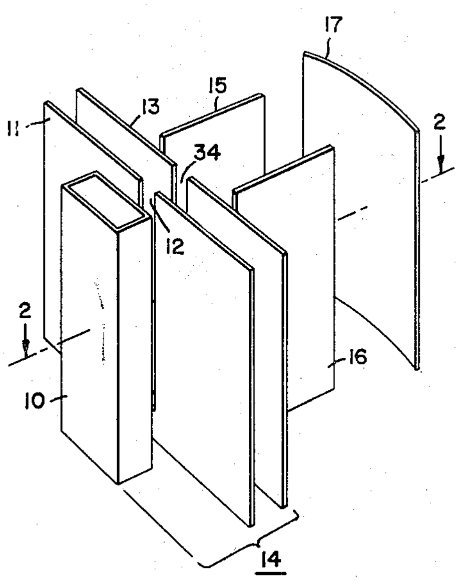
Figure 1 is a perspective view of the electrode system of one embodiment of a beam-deflection tube constructed in accordance with the present invention.

As shown in the perspective view of Figure 1, the electrode system of a beam-deflection tube or electron-discharge device constructed in accordance with one embodiment of the invention comprises an elongated cathode 10, a focusing electrode 11 including a centrally located slot 12 and an accelerating electrode 13 having a central aperture or slot 34 aligned with focusing-electrode slot 12. Cathode 10 and electrodes 11 and 13 form a part of an electron gun 14 for projecting a sheet-like beam of electrons along a predetermined path. The terminology "sheet-like beam of electrons," as used throughout this specification and in the appended claims, refers to an electron beam which, in cross section, has one principal dimension which is very much greater than a second principal dimension; the term is not restricted to any particular cross-sectional configuration. Thus, a sheet-like beam may be of rectangular cross-sectional configuration with a thickness very much smaller than its width, or may be of generally ellipsoidal cross-sectional configuration, similarly elongated, or may comprise a beam of annular or ring-like configuration when viewed in cross-section. Consequently, it will be understood that the particular structure shown for electron gun 14 is purely illustrative and that any suitable structure for projecting a sheet-like beam in accordance with the definition given above may be employed.

A pair of deflector-receptor electrodes 15 and 16 are disposed on opposite sides of the path of the electrons projected from electron gun 14 and are positioned intermediate accelerator 13 and a reflector electrode 17. Electrodes 11, 13, 15, 16 and 17 may be formed from any of the many known electrically conductive materials suitable for use in evacuated electron-discharge devices.

Figure 2:
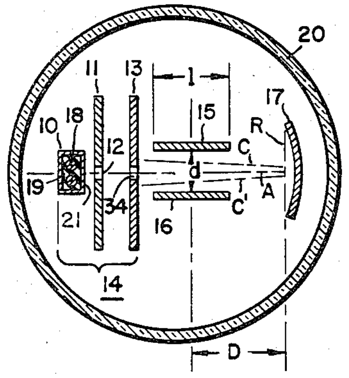
Figure 2 is a cross-sectional view taken along line 2—2 of Figure 1, also showing the envelope in which the electrode system is mounted.

As illustrated in Figure 2, in which the electrode system of Figure 1 is shown in cross-section, cathode 10 is provided with an indirect heater element 18 embedded in insulating material 19 and supported within the cathode sleeve. The entire electrode system is mounted within a suitable envelope 20, preferably a conventional miniature tube envelope, which is subsequently evacuated and gettered in any manner known in the art.

In operation, space electrons originating at the emissive surface 21 of cathode 10 are formed into a focused electron beam by electrodes 11 and 13 and are projected along a predetermined path, indicated by dash line A, between deflector-receptor electrodes 15 and 16. The velocity of the electron beam as it passes between electrodes 15 and 16 is determined by the potential of the deflector-receptor electrodes with respect to cathode 10; it will be understood that accelerating electrode 13 may be omitted, if desired, in which case the leading edges of electrodes 15 and 16 may be considered as constituting the accelerator of the electron gun. If a separate accelerator is utilized, as in the illustrated structure, and the accelerator is established at a D. C. potential different from electrodes 15 and 16, an electrostatic lens may be formed between the accelerator and the deflector-receptor electrodes. The lens thus formed may be employed to focus and direct the electron beam more accurately between electrodes 15 and 16 and thus to permit effective use of a shorter separation distance *d* between the deflector-receptor electrodes.

The beam is electrostatically coupled to electrodes 15 and 16 so that, as in any conventional beam-deflection tube, the mean path of the beam from the effective center of deflection toward reflector electrode 17 may be controlled by varying the potential difference between the deflector-receptor electrodes. If the bias potentials of electrodes 15 and 16 are substantially equal, the mean path of the beam as it proceeds toward reflector 17 coincides substantially with the original beam path A, and operation in this manner has been indicated in the drawing for purposes of convenience; however, it may be desirable under certain circumstances to operate the deflector-receptor electrode system comprising electrodes 15 and 16 under bias conditions such that the path of the beam is displaced from the original path A, and an arrangement of this type is entirely within the scope of the present invention.

In the conventional type of beam-deflection tube, a collector electrode system is disposed across beam path A at some point spaced from the deflection electrodes and is employed to derive the output signal. An alternative prior art type of structure utilizes two pairs of electrodes aligned adjacent to beam path A in a manner similar to the disposition of electrodes 15 and 16 and consecutively interposed between an electron gun and a collector electrode; one of these electrode pairs is employed to deflect the beam in accordance wth an applied signal, whereas the other pair of electrodes are utilized as receptors to derive an output signal by inductive coupling to the beam. Electrode 17, however, is not an electron collector; instead, the reflector is biased to a potential equal to or negative with respect to that of cathode 10, so that an effective reflector plane, indicated by dash line R, is established in front of reflector 17. Consequently, when the space electrons emitted from gun 14 reach reflector plane R, they are re-directed back toward the electron gun along paths substantially parallel to the original electron beam path, as indicated by dash lines C and C′, and are collected by accelerator 13. It should be noted that the term "receptor," as applied to electrodes 15 and 16, refers to the reception of electrical signals by means of the electrostatic or inductive coupling between electrodes 15 and 16 and the reflected electron beam; these elements are not employed as electron collectors.

Figure 2A:
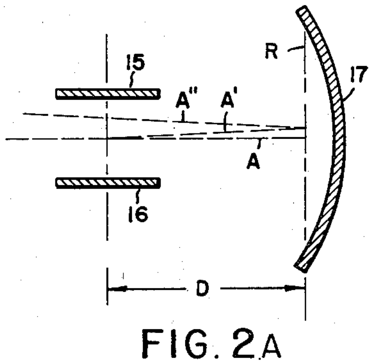
Figure 2A is an explanatory diagram including an enlarged view of a portion of the structure of Figure 2.

In order to reach a more complete understanding of the embodiment of the invention illustrated in Figures 1 and 2, consideration will first be given to operation of the device with an alternating potential applied between electrodes 15 and 16. Under these conditions, as illustrated in Figure 2A, an electron E passing between electrodes 15 and 16 at a time when electrode 15 is positively charged with respect to electrode 16 is deflected from its original path A to follow a deflected path A′. Electron E proceeds along path A′ until it reaches effective reflector plane R, and is then re-directed back between electrodes 15 and 16 along a reflection path A″. As electron E follows path A″ between electrodes 15 and 16, a current is induced in the deflector-receptor electrodes; if the induced current is greater than the original current required to deflect the electrons of the beam and is properly phased with respect thereto, a condition of self-sustaining oscillation may be attained.

Upon first examination, an oscillator of the type described immediately above may appear to be infeasible since, in their function as signal receptors, electrodes 15 and 16 are affected only by motion of the electron beam transversely to beam path A, whereas the only transverse velocity component appears to be that contributed by the deflecting signal itself and the only available source of additional energy, the electron motion along path A, has no component in the transverse direction. This apparent paradox is resolved by the fact that electrons entering or leaving the transverse field between electrodes 15 and 16 must pass through a region in which the field has an axial component. Thus, electron E of Figure 2A, proceeding along path A″, enters the field region near plate 15, which may instantaneously be negatively charged, and is decelerated. While the electron travels between electrodes 15 and 16, the transverse field may reverse its polarity; however, since there is no axial field between the electrodes, the axial velocity of the electron is not affected. When the electron arrives at the end of receptor 15 adjacent electron gun 14, it must again leave against an axial field, because plate 15 has meanwhile become positive in polarity; thus, the electron is again decelerated. Consequently, it is possible to convert kinetic energy from the axial motion originally produced by the D. C. potentials applied to the electrodes of the tube into energy at the signal frequency.

In order to achieve oscillation, it is necessary that the phase angle between the deflection signal applied to electrodes 15 and 16 and the signal induced in those same electrodes by the electron beam reflected from plate R be 360 electrical degrees or some integral multiple thereof at the deflection-signal frequency. The reflected beam, visualized from a stationary point, presents a wave pattern defined by the excursions of the reflected electrons with respect to the original beam path A and having a frequency corresponding to the frequency of the deflecting signal. The phase relationship between the deflecting signal and the signal induced in the deflector-receptor electrodes by the reflected beam is determined by the coupling delay angle of the device, which may be defined as the phase angle between the voltage-difference signal across electrodes 15 and 16 and the simultaneously observed excursion of the reflected beam arriving at the center of the deflector-receptor electrodes. Because the signal which the reflected beam induces in electrodes 15 and 16 leads the excursion of the beam by 90°, the effective coupling delay angle for operation as an oscillator must be 270 electrical degrees or three-fourths of a cycle at the frequency of oscillation.

Figure 3:
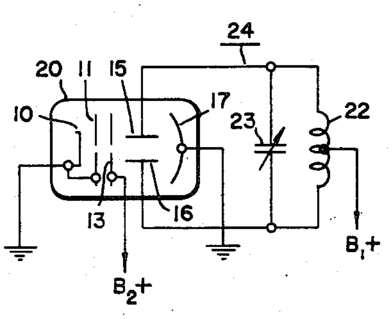
Figure 3 is a schematic diagram of an oscillator circuit employing the electron-discharge device of Figures 1 and 2.

For the embodiments of the invention illustrated in Figures 1–3, the effective coupling delay angle is equal to the electron transit angle determined by the time required for the electrons to travel from the center of electrodes 15 and 16 to reflector plane R and back again and by the signal frequency. The distance D separating the centers of electrodes 15 and 16 from reflector plane R (Figure 2) establishes the electron transit time for any given beam velocity, and the beam velocity may be adjusted to make the total effective electron transit angle, which in this instance is equal to the total effective coupling delay angle, equal to substantially 270 electrical degrees at any selected frequency within the operating range of the device.

The schematic diagram of Figure 3 illustrates an oscillator circuit employing a beam-deflection tube of the type illustrated in Figures 1 and 2. In this oscillator, cathode 10 is connected to a source of reference potential, here shown as ground, and focusing electrode 11 is connected to cathode 10. Accelerating electrode 13 is connected to a source of unidirectional positive biasing potential $B_2+$, and reflector 17 is grounded. An inductive load comprising an inductor 22 is connected across deflector-receptor electrodes 15 and 16; a variable capacitor 23 may be connected in parallel with inductor 22 to provide a means for varying the effective load reactance. The load circuit comprising inductor 22 and capacitor 23, in conjunction with the capacity between electrodes 15 and 16, forms a resonant circuit 24 having a predetermined resonance frequency, and, consequently, a predetermined resonance period. A variable source of unidirectional positive potential $B_1+$ is connected to the electrical center of inductor 22 to establish electrodes 15 and 16 at a positive potential with respect to cathode 10 and thus establish a predetermined velocity for the electron beam passing between these electrodes. For a given beam velocity, resonant circuit 24 is tuned so that its resonance period is approximately equal to eight-thirds times the electron transit time required for the beam projected from cathode 10 to pass from the centers of deflector-receptor electrodes 15 and 16 to the effective reflector plane established by reflector 17. Under these conditions, since the average velocity of the reflected beam is approximately equal to the average velocity of the originally projected beam, the total electron transit time for passage of electrons from the deflector-receptor system comprising electrodes 15 and 16 to the reflector plane and back again is approximately equal to 270 degrees or three-fourths of a cycle at the frequency to which circuit 24 is tuned, and an oscillatory current having a frequency approximately equal to the resonance frequency of circuit 24 is generated in the tuned circuit.

An oscillator of the type illustrated in Figure 3, employing a beam-deflection tube constructed in accordance with Figures 1 and 2, may be made to oscillate with relatively low beam currents of the order of a few milliamperes or less; at frequencies between 500 and 1000 megacycles, the tube is easily self-excited and operates at frequencies approximately 15% above or below the frequency at which the coupling delay angle is theoretically correct without requiring any change in the operating voltages. For a typical construction, the total length of beam path A may be approximately one-half inch with the major dimension of the elongated cathode approximately three-fourths of an inch. All of the electrode configurations are extremely simple and the electrodes may be formed from thin metallic sheets by punching or similar operations; the spacing between elements is not extremely critical, and this permits the utilization of reasonable manufacturing tolerances. Furthermore, and for the same reason, variations in the spacing between electrodes caused by changes in thermal operating conditions do not adversely affect the frequency stability of the device.

It has been determined that best operational results are obtained if the lengths 1 of deflector-receptor electrodes 15 and 16 in a direction parallel to electron beam path A correspond approximately to the distance traveled by the beam electrons during one-half cycle at the operating frequency; consequently, the length of these electrodes should be determined so as to fulfill this condition at the center frequency of the band over which the oscillator is intended to operate. Moreover, the amplitude of the signal induced in electrodes 15, 16 by the reflected beam is directly proportional to the aspect ratio of the tube, which may be defined as the ratio of electrode length 1 to the distance $d$ separating the electrodes (see Figure 2); in order to achieve satisfactorily stable operation at relatively low beam currents, electrode length $l$ should be much larger than distance $d$ to provide a high $l/d$ or aspect ratio.

Figure 4:
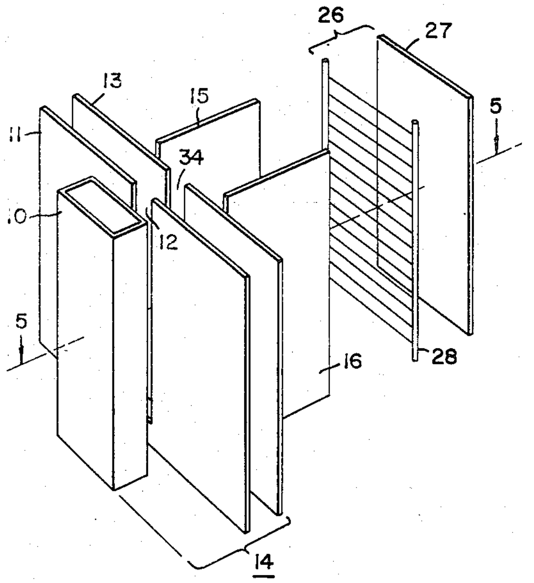
Figure 4 is a perspective view of the electrode system of a beam-deflection discharge device in accordance with another embodiment of the invention.

The embodiment of the invention shown in the perspective view of Figure 4 is in many respects essentially similar to that of Figures 1 and 2. As in the previously-described embodiment, the electrode system includes electron gun 14 comprising cathode 10, slotted focusing electrode 11 and similarly slotted accelerating electrode 13. As in the embodiment shown in Figures 1 and 2, deflector-receptor electrodes 15 and 16 are disposed on opposite sides of the path of the electron beam projected from gun 14. In Figure 4, however, a reflector electrode system 26 comprising a reflector electrode 27 and a grid lens electrode 28 replaces the simple reflector electrode 17 of the previously-described device. As best shown in the cross-sectional view of Figure 5, reflector electrode system 26 is disposed transversely across electron beam path A in spaced relation to electron gun 14 and the effective reflector plane R determined by system 26 is spaced from the centers of electrodes 15 and 16 by a predetermined distance D'.

Figure 5:
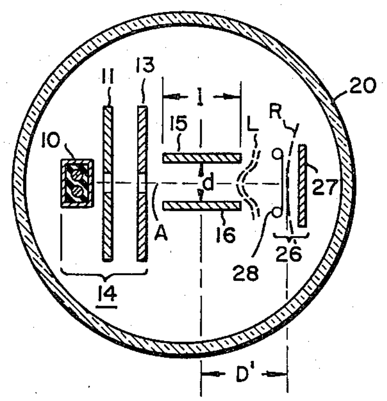
Figure 5 is a cross-sectional view taken along line 5—5 of Figure 4 and including the tube envelope.
Figure 6:
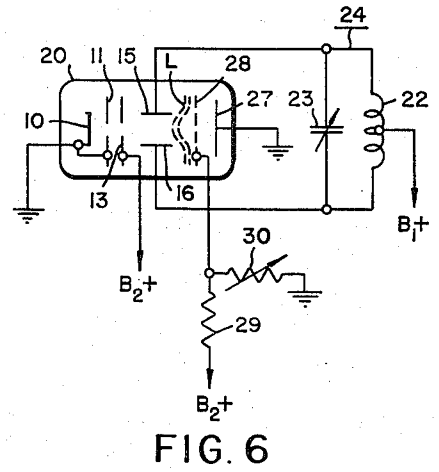
Figure 6 is a schematic diagram of an oscillator circuit employing the beam-deflection tube illustrated in Figures 4 and 5.

An oscillator circuit employing the device shown in Figures 4 and 5 is schematically illustrated in Figure 6. In that figure, cathode 10 and focusing electrode 11 are connected to ground and accelerating electrode 13 is connected to unidirectional potential source $B_2+$. Furthermore, deflector-receptor electrodes 15 and 16 are connected to a parallel inductance-capacitance circuit comprising coil 22 and capacitor 23 to form resonant circuit 24. Reflector 27 is connected to ground, and grid 28 is connected to bias source $B_2+$ through a voltage divider comprising a fixed resistor 29 and a variable resistor 30. The electrical center of coil 22 is connected to variable bias potential source $B_1+$.

The embodiment of the invention illustrated in Figures 4–6 is essentially similar in most respects to the apparatus shown in Figures 1–3 except for the reflector electrode system. The operation of reflector electrode system 26 may best be understood by reference to Figure 7, which represents the light-optical equivalent of reflector 27 and lens screen 28. A plane mirror 31 is mounted in the focal plane of a convergent lens 32 so that parallel light rays 33 which impinge upon the lens from a given direction and are focused upon mirror 31 are reflected therefrom and projected back through lens 32 in a direction indicated by lines 25 essentially parallel but opposite in sense to incident light rays 33. Thus, light rays which are originally directed downwardly are re-directed upwardly at the same angle, so that, if the angle of incidence of rays 33 is considered as produced by a deflector system, the result of passing the rays through the reflector system comprising lens 32 and mirror 31 is to reverse the sense of deflection.

Figure 7:
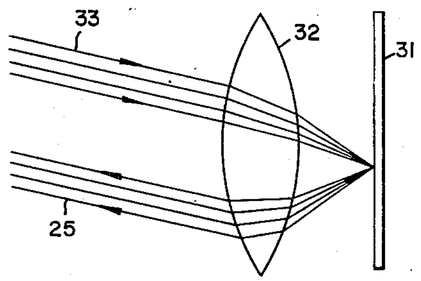
Figure 7 is an explanatory diagram illustrating the light-optical equivalent of a portion of the structure of Figure 5.

Reflector system 26 of Figures 4–6 operates as the electrical equivalent of the light-optical reflector system illustrated in Figure 7. Screen 28 is maintained at a positive potential with respect to deflector-receptor electrodes 15 and 16 so that a convergent electron-optical lens is formed between grid 28 and the deflector-receptor electrodes, as indicated by dash lines L in Figures 5 and 6 representing equipotential planes. The electrostatic field between grid 28 and reflector electrode 27, on the other hand, is substantially homogeneous. It should be noted that the screen wires of electrode 28 extend across beam path A in the same direction as the minor dimension of the beam so that field disturbances produced by the individual wires do not lead to defocusing effects. Reflector electrode system 26 functions in a manner analogous to the optical system of Figure 7, so that the excursion of the reflected electron beam emerging therefrom is shifted in phase 180 degrees with respect to the excursion of the incident electron beam. Consequently, in order to obtain a total effective coupling delay angle of substantially 270 electrical degrees at a given frequency, distance D' (Figure 5) separating the centers of electrodes 15 and 16 from the effective reflector plane R established by reflector electrode 27 must correspond approximately to the distance traversed by the electrons of the beam during a time interval equal to 45 degrees or one-eighth cycle at the operating frequency of the oscillator. Accordingly, the unipotential voltage applied to deflector-receptor electrodes from source $B_1+$ is adjusted so that the beam velocity and distance D′ establish the requisite electron transit time, and the 270 degree or three-fourths cycle phase shift necessary for oscillation is achieved by the combination of a 45 degree transit angle from the centers of the deflector-receptor electrodes through the electrostatic lens field L to reflector plane R, the 180 degree phase shift imparted to the beam by the lens, and the 45 degree electron transit angle required for the electron to return from reflector plane R to the centers of the reflector-deflector electrodes. In this embodiment, as in that of Figures 1–3, electrode length $l$ should be relatively large with respect to separation distance $d$ to establish a relatively large aspect ratio $l/d$ and permit operation at relatively low beam current values.

In the foregoing description of the embodiments of the invention illustrated in Figures 1–3 and 4–6, operating conditions in which the reflected electrons pass between the deflector-receptor electrodes along paths substantially parallel to the original electron beam path have been considered. However, minor changes in the configuration of reflector 17 or a change in the positive operating potential of screen 28 with respect to electrodes 15 and 16 may be employed to re-direct the reflected electrons along trajectories external to the deflector-receptor electrode system. Under such operating conditions, the signals induced in the deflector-receptor electrodes are 180 degrees out of phase with respect to signals derived when the re-directed electrons pass between electrodes 15 and 16; the effect is the same as that accomplished by the reversal in the sense of deflection as described in connection with the lens system of Figures 4–5. The accelerating potential applied to electrode 13 may then be adjusted to change the velocity of the electron beam and increase the total electron transit time from 270 degrees to 450 degrees (or decrease it to 90 degrees) for the embodiment of Figures 1–3 or from 90 degrees to 270 for the embodiment of Figures 4–6. The total effective coupling delay angle for each of these two embodiments with the re-directed electrons passing behind the deflector-receptor electrodes, is still substantially equal to 270 electrical degrees at the oscillation frequency when the 180 degree phase shift resulting from re-direction of the electrons to pass behind the deflector-receptor system and the 180 degree shift introduced by lens L are taken into account.

The effective electron transit time through distance D of Figure 2 and distance D′ of Figure 5 may be increased by any integral multiple of 180 electrical degrees, effecting a total or "round-trip" increase of integral multiples of 360 electrical degrees, without disturbing the phase relationship necessary for sustaining oscillation in resonant circuit 24 (Figures 3 and 6). However, for both structures, it is necessary that the effective electron transit angle for passage of the electrons from the centers of deflector-receptor electrodes to reflector plane R and back again be substantially equal to an odd integral multiple of 90 electrical degrees at the oscillation frequency; for the embodiment of Figures 1–3, this odd integral multiple is one of the series 3, 7, 11, 15 etc., while for the embodiment of Figures 4–6, the odd integral multiple is one of the series 1, 5, 9, 13 etc. Expressed in another way, the effective electron transit angle for passage of the electrons from the center of the deflector-receptor electrodes to reflector plane R and back again is substantially equal to $90(4n-1)$ electrical degrees for the embodiment of Figures 1–3 and is substantially equal to $90(4n-3)$ electrical degrees for the embodiment of Figures 4–6, where $n$ is any integer. The difference between the two equations represents the 180 electrical degree delay introduced by the action of the convergent electrostatic lens embodied in Figures 4–6. In either case, the total effective coupling delay angle is substantially equal to 270 electrical degrees at the selected frequency.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. An electron-discharge device of the beam-deflection type for generating electrical oscillations of a predetermined frequency, said device comprising: an electron gun for projecting a sheet-like beam of electrons along a predetermined path; a reflector electrode system, disposed transversely across said electron-beam path in spaced relation to said electron gun, for establishing an effective reflector plane to re-direct a stream of said electrons toward said electron gun, and a pair of deflector-receptor electrodes disposed on opposite sides of said electron-beam path intermediate said electron gun and said reflector electrode system in inductive coupling relation to said projected electron beam and to said re-directed stream of electrons, said deflector-receptor electrodes being arranged to pass substantially all of said re-directed stream of electrons back toward said eletcron gun.

2. An electron-discharge device of the beam-deflection type for generating electrical oscillations of a predetermined frequency, said device comprising: an electron gun for projecting a sheet-like beam of electrons along a predetermined path; a reflector electrode system, disposed transversely across said electron-beam path in spaced relation to said electron gun, for establishing an effective reflector plane to re-direct a stream of said electrons toward said electron gun; and means including a pair of deflector-receptor electrodes disposed on opposite sides of said electron-beam path intermediate said electron gun and said reflector electrode system in inductive coupling relation to said projected electron beam and to said re-directed stream of electrons for establishing a predetermined velocity for said beam, said deflector-receptor electrodes being arranged to pass substantially all of said re-directed stream of electrons back toward said electron gun, with the centers of said electrodes displaced from said effective reflector plane by a predetermined distance related to said predetermined velocity to establish a total effective coupling delay angle of substantially 270 electrical degrees at said predetermined frequency.

3. An electron-discharge device of the beam-deflection type for generating electrical oscillations of a predetermined frequency, said device comprising: an electron gun for projecting a sheet-like beam of electrons along a predetermined path; a reflector electrode system, disposed transversely across said electron-beam path in spaced relation to said electron gun, for establishing an effective reflector plane to re-direct a stream of said electrons toward said electron gun; and means including a pair of deflector-receptor electrodes disposed on opposite sides of said electron-beam path intermediate said electron gun and said reflector electrode system in inductive coupling relation to said projected electron beam and to said re-directed stream of electrons for establishing a predetermined velocity for said beam, said deflector-receptor electrodes being arranged to pass substantially all of said re-directed stream of electrons back toward said electron gun with the centers of said electrodes being displaced from said effective reflector plane by a predetermined distance related to said predetermined velocity to establish an effective electron transit angle for passage of said electrons from said deflector-receptor electrodes to said reflector plane and back again substantially equal to an odd integral multiple of 90 electrical degrees at said predetermined frequency.

4. An electron-discharge device of the beam-deflection type for generating electrical oscillations of a predetermined frequency, said device comprising: an electron gun for projecting a sheet-like beam of electrons along a predetermined path; a reflector electrode system, disposed transversely across said electron-beam path in spaced relation to said electron gun, for establishing an effective reflector plane to re-direct a stream of said electrons toward said electron gun; and means including a pair of deflector-receptor electrodes disposed on opposite sides of said electron-beam path intermediate said electron gun and said reflector electrode system in inductive coupling relation to said projected electron beam and to said re-directed stream of electrons for establishing a predetermined velocity for said beam, said deflector-receptor electrodes being arranged to pass substantially all of said re-directed stream of electrons back toward said electron gun with the centers of said electrodes being displaced from said effective reflector plane by a predetermined distance related to said predetermined velocity to establish a total effective electron transit angle for passage of said electrons from said deflector-receptor electrodes to said reflector plane and back again of substantially 270 electrical degrees at said predetermined frequency.

5. An electron-discharge device of the beam-deflection type for generating electrical oscillations of a predetermined frequency, said device comprising: an electron gun for projecting a sheet-like beam of electrons along a predetermined path; a reflector electrode, disposed transversely across said electron-beam path in spaced relation to said electron gun, for establishing an effective reflector plane to re-direct a stream of said electrons toward said electron gun along paths substantially parallel to said electron-beam path; and means including a pair of deflector-receptor electrodes disposed on opposite sides of said electron-beam and return paths intermediate said electron gun and said reflector electrode system in inductive coupling relation to said projected electron beam and to re-directed stream of electrons for establishing a predetermined velocity for said beam, said deflector-receptor electrodes being arranged to pass substantially all of said re-directed stream of electrons back toward said electron gun with the centers of said electrodes being displaced from said effective reflector plane by a predetermined distance related to said predetermined velocity to establish a total effective electron transit time for passage of said electrons from said deflector-receptor electrodes to reflector plane and back again of substantially three-fourths cycle at said predetermined frequency.

6. An oscillator of the beam-deflection type comprising: an electron gun for projecting a sheet-like beam of electrons along a predetermined path; a reflector electrode system, disposed transversely across said electron-beam path in spaced relation to said electron gun, for establishing an effective reflector plane to re-direct a stream of said electrons toward said electron gun along paths substantially parallel to said electron-beam path; means including a pair of deflector-receptor electrodes disposed on opposite sides of said electron-beam path intermediate said electron gun and said reflector electrode system in inductive coupling relation to said projected electron beam and to said re-directed stream of electrons for establishing a predetermined velocity for said beam, said deflector-receptor electrodes being arranged to pass substantially all of said re-directed stream of eelctrons back toward said electron gun with the centers of said electrodes being displaced from said effective reflector plane by a predetermined distance; and means including an inductive load connected across said deflector-receptor electrodes to form therewith a resonant circuit having a predetermined resonance period approximately equal to eight-thirds of the electron transit time for passage of the electrons of said beam from said centers of said deflector-receptor electrodes to said effective reflector plane.

7. An electron-discharge device of the beam-deflection type for generating electrical oscillations of a predetermined frequency, said device comprising: an electron gun for projecting a sheet-like beam of electrons along a predetermined path; a reflector electrode, disposed transversely across said electron-beam path in spaced relation to said electron gun, for establishing an effective reflector plane to re-direct a stream of said electrons toward said electron gun; a convergent electrostatic lens comprising at least one electrode interposed between said electron gun and said reflector electrode; and means including a pair of deflector-receptor electrodes disposed on opposite sides of said electron-beam path intermediate said electron gun and said lens electrode in inductive coupling relation to said projected electron beam and to said re-directed stream of electrons for establishing a predetermined velocity for said beam, said deflector-receptor electrodes being arranged to pass substantially all of said re-directed stream of electrons back toward said electron gun with the centers of said deflector-receptor electrodes displaced from said effective reflector plane by a predetermined distance related to said predetermined velocity to establish a total effective coupling delay angle of substantially 270 electrical degrees at said predetermined frequency.

8. An electron-discharge device of the beam-deflection type for generating electrical oscillations of a predetermined frequency, said device comprising: an electron gun for projecting a sheet-like beam of electrons along a predetermined path; a reflector electrode, disposed transversely across said electron-beam path in spaced relation to said electron gun, for establishing an effective reflector plane to re-direct a stream of said electrons toward said electron gun; a convergent electrostatic lens comprising at least one electrode interposed between said electron gun and said reflector electrode; and means including a pair of deflector-receptor electrodes disposed on opposite sides of said electron-beam path intermediate said electron gun and said lens electrode in inductive coupling relation to said projected electron beam and to said re-directed stream of electrons for establishing a predetermined velocity for said beam, said deflector-receptor electrodes being arranged to pass substantially all of said re-directed stream of electrons back toward said electron gun with the centers of said deflector-receptor electrodes being displaced from said effective reflector plane by a predetermined distance related to said predetermined velocity to establish an effective electron transit angle for passage of said electrons from said deflector-receptor electrodes to said reflector plane and back again substantially equal to an odd integral multiple of 90 electrical degrees at said predetermined frequency.

9. An oscillator of the beam-deflection type comprising: an electron gun for projecting a sheet-like beam of electrons along a predetermined path; a reflector electrode, disposed transversely across said electron-beam path in spaced relation to said electron gun, for establishing an effective reflector plane to re-direct a stream of said electrons toward said electron gun; a convergent electrostatic lens comprising at least one electrode interposed between said electron gun and said reflector electrode; means comprising a pair of deflector-receptor electrodes disposed on opposite sides of said electron-beam path intermediate said electron gun and said lens electrode in inductive coupling relation to said projected electron beam and to said re-directed stream of electrons for establishing a predetermined velocity for said beam, said deflector-receptor electrodes being arranged to pass substantially all of said re-directed stream of electrons back toward said electron gun with the centers of said deflector-receptor electrodes being displaced from said effective reflector plane by a predetermined distance; and means including an inductive load connected across said deflector-receptor electrodes to form therewith a resonant circuit having a predetermined resonance period approximately equal to eight times the electron transit time for passage of the electrons of said beam from said centers of said deflector-receptor electrodes through said lens to said effective reflector plane.

10. An electron-discharge device of the beam-deflection type for generating electrical oscillations of a predetermined frequency, said device comprising: an electron gun for projecting a sheet-like beam of electrons along a predetermined path; means including a pair of deflector-receptor electrodes disposed on opposite sides of said electron-beam path for establishing a predetermined velocity for said beam and for deflecting said beam from said path; and a reflector electrode system, disposed transversely across said electron-beam path at a predetermined distance from the centers of said deflector-receptor electrodes, for establishing an effective reflector plane to redirect said electron beam back between said deflector-receptor electrodes toward said electron gun and for effectively reversing the sense of the deflection of said beam, said predetermined distance being so related to said predetermined velocity as to establish a total effective transit time for passage of said electrons from said deflector-receptor electrodes to said reflector plane and back again of substantially one-fourth cycle at said predetermined frequency.

References Cited in the file of this patent

UNITED STATES PATENTS

| | | |
|---|---|---|
| 2,075,379 | Varian | Mar. 30, 1937 |
| 2,462,087 | Fremlin | Feb. 22, 1949 |
| 2,582,045 | Lafferty | Jan. 8, 1952 |